United States Patent Office 2,859,192
Patented Nov. 4, 1958

2,859,192

COMBINATIONS OF VINYL AQUEOUS EMULSIONS AND RESINOUS ACETONE-FORMALDEHYDE REACTION PRODUCTS

Mortimer T. Harvey, South Orange, and Peter L. Rosamilia, Newark, N. J., assignors to Harvel Research Corporation, Irvington, N. J., a corporation of New Jersey No Drawing. Application September 22, 1955
Serial No. 536,037

8 Claims. (Cl. 260—29.6)

This invention relates to novel compositions of matter and to methods for preparing them and also to novel articles of manufacture made therewith.

Prior to this invention, normally solid polymers and copolymers of vinyl acetate and vinyl chloride have found extensive application as laminating media. These vinyl resins may be purchased on the open market in a variety of forms. One of the forms thereof in which great quantities are used commercially is the aqueous emulsion. The aqueous emulsion of said vinyl resins are applied by means of spreader rolls, for example, to paper or the like which may or may not have its surface coated with some other material such as varnish, resin, dextrine, glue, etc. After being coated with said emulsion from the spreader rolls, the paper carrying the emulsion has a layer of newsboard, for example, applied thereto to provide a multiple element laminated structure of paper and newsboard with the emulsion adhesive therebetween securing said layers to each other. Such laminated structures find a variety of applications, among which is that of bottle cap liners after being sheared into appropriate shape and size, generally in disc form.

For a considerable time, it has been known to the art that said emulsions have a number of inherent disadvantages. Among some of them are the following: (a) when spreading rolls are employed for coating the aqueous emulsions, considerable foaming builds up on the rolls which deleteriously affects the bond of the finished product; (b) when the common defoamers are used to prevent the building up of foam on the spreading rolls, the strength of the bond of the finished product is considerably decreased; (c) when certain types of paper, such as the varnish or resin coated type papers have a coating of said emulsion applied thereto and bonded to newsboard or the like, the finished product develops a concave curling. This is disadvantageous especially when that finished product is cut into discs for use as bottle cap liners. It has been found that the fingers of machines which handle such linings have difficulty holding a very concave lining and consequently it drops off the fingers, thus disrupting continuous operation, (d) after several months of storage of said finished product there is a decrease in the tensile strength of the bond and sometimes delamination of the layers due to the excessive drying out of the adhesive.

After extended experimentation, it has been discovered that said emulsions may be modified to provide novel compositions of exceptional properties and also to provide novel products therewith. We have found that combining resinous reaction products of acetone and formaldehyde with said aqueous emulsions resulted in combinations which were far superior in many respects to the aqueous emulsions without said addition. The resinous reaction products of acetone and formaldehyde are produced by reacting acetone and formaldehyde under alkaline conditions. Said acetone-formaldehyde reaction products may be characterized as being water soluble and thermosetting, that is, capable, upon baking at 300° F. for sixteen hours in the presence of lime measuring 5% of its weight, to be converted to the dry and substantially infusible state. The mole ratio of acetone to formaldehyde in the reaction may be 1 of acetone to 2–6 of formaldehyde and preferably 1 of acetone to 2–5 of formaldehyde. The amount of said acetone-formaldehyde reaction product combined with said aqueous emulsion is such that for each 4 parts of the former there is 1–16 parts of the vinyl resin in the latter. The acetone-formaldehyde reaction products are water soluble and of such viscosity that when 4 parts thereof are dissolved in 1 part of water, the resultant solution shall have viscosity at 25° C. of at least 600 centipoises and for adhesive purposes, 2,000–10,000 centipoises.

By providing said novel combinations, we have found them to have the following advantages as laminating media over said aqueous emulsions in the absence of the acetone-formaldehyde reaction products and some of them are as follows: (a) the presence of the acetone-formaldehyde reaction products in the combination reduced and sometimes completely eliminated foaming at the spreader rolls without in any way decreasing the tensile strength of the bond; (b) the presence of the acetone-formaldehyde reaction products reduces the tendency of the laminated structure to curl or buckle thus a more nearly flat finished product is obtainable; (c) the presence of the acetone-formaldehyde reaction products provide a more uniform finished product which ages well under all normal conditions of temperature and humidity over extended periods of time and thus effectively reduces the liability of delamination; and (d) still another factor of importance is that a less expensive and better product is available because of the lower cost of said acetone-formaldehyde reaction products.

The following is given merely by way of illustrating a method for producing acetone-formaldehyde resinous reaction products.

Example A 300 lbs. of acetone together with 1700 lbs. of formaldehyde (37% concentration in water) were charged into an autoclave unit with the steam on and the stirring equipment in operation to raise the temperature of the mix to approximately 120° F. In a separate container there was made up an aqueous solution of caustic soda consisting of 25 lbs. NaOH and 60 lbs. water. This solution was divided into 4 equal portions. The first portion of caustic soda solution was added and the steam cut off. The temperature of the mix rises to 130° F. and the cold water is turned on as an exothermic reaction takes place and the temperature slowly rises to 200° F. then slowly begins to fall; the second portion of caustic soda-water solution is added whereupon the temperature again rises to 200° F. Upon cooling to 185° F. the procedure is repeated allowing the temperature to rise and fall between the additions of caustic soda-water solution and keeping the cold water on the jacket at all times. The mass is then allowed to cool to 145° F. at which time the cold water is shut off. Vacuum is turned on keeping the vent of the autoclave open. The vent is slowly closed and the steam turned on. Dehydration may be continued to produce a resin of 75%–100% solids. The amount of resin produced measured more than 75% of the combined weights of the acetone and formaldehyde in the original charge. The resin is amber colored, is thermosetting and is stable for at least 6 months at 30° C., cures to the infusible state in two hours at 140° C., gels at room temperature within 4 hours upon adding 10% lime and an 80% aqueous solution thereof at 25° C. has a viscosity of about 800 centipoises and is hereinafter known as product A.

In the dehydration step, it is preferred that it be terminated when the percentage solids is between 75%–

85% solids, that is, 75%–85% by weight of the solution is the acetone-formaldehyde reaction product. Then said reaction product may be treated to increase its viscosity, and to decrease the free formaldehyde content thereof. For that purpose said aqueous solution of said partially dehydrated acetone-formaldehyde reaction product is placed in a reacting vessel and there is added thereto an aqueous solution of an alkali and preferably a mild alkali such as sodium sulphite, sodium acetate, potassium sulphite or equivalent compound to increase the pH of the mix. The mix is heated slowly to a temperature of about 250° F. and is maintained until the viscosity of 4 parts of the resin therein, when dissolved in 1 part of water, measures more than 600 and no greater than 10,000 centipoises at 25° C. and when it is to be used as an adhesive, measures 2,000–10,000 centipoises at 25° C. This provides a simple, easily controllable method which is eminently suitable in factory practice for thickening or increasing the viscosity of the acetone-formaldehyde resin to the desired degree, and practically eliminating the danger of the resin going to the infusible state. More specifically, for example, 250 lbs. of an 80% solution of said acetone-formaldehyde resin, after the partial dehydration step, is now mixed with an aqueous solution consisting of approximately 7 lbs. of sodium sulphite dissolved in a small amount of water. The mixture is heated to approximately 250° F. and maintained at that temperature until a sample of 4 parts of the acetone-formaldehyde resin, when dissolved in 1 part of water, is in the aforementioned viscosity range of 600–10,000 centipoises at 25° C.

When the desired viscosity is reached, the heat is cut off and enough water is added to the resin to provide a solution which measures 4 parts of acetone-formaldehyde resin to each part of water present. This batch which is an aqueous solution of said acetone-formaldehyde resin will be within the viscosity range heretofore set forth. By controlling the extent of heating, there may be provided such aqueous solutions consisting of 4 parts acetone-formaldehyde reaction products to 1 part of water, having viscosities at 25° C. of 2,300, 3,000 and 7,000 centipoises respectively and said products are hereinafter known as products 1A, 2A and 3A.

While in the aforesaid general example there has been described the method for producing said resinous reaction products with a ratio of acetone to formaldehyde being 1–4, it is understood of course that the same method may be employed and ratio of acetone and formaldehyde may be varied within the limits hereinbefore set forth, to produce a variety of reaction products all of which, of course, are water soluble and thermosetting and serve as components of this invention.

The combinations of this invention may be readily and easily produced. Aqueous emulsions of said normally solid vinyl resins, for example, polymers of vinyl acetate and vinyl chloride as well as the copolymers thereof, either alone or in various mixtures, are the dispersed phase of the emulsion while the water is the continuous phase. The percentage of said vinyl resin in the emulsion may vary over a comparatively wide range and may be between about 30%–50% by weight. To such emulsions there may be added said resinous acetone-formaldehyde reaction products, either in the anhydrous form or in aqueous solution, depending upon the desired "solids" content, the desired consistency, and the desired characteristic of the finished product. In any case, it is preferable that the quantity of the water soluble, thermosetting acetone-formaldehyde resinous product added is such that for each 4 parts thereof added, there is present 1–16 parts of the vinyl resin in the aqueous emulsion. Then this mixture, by a simple agitation, by means of an ordinary stirrer, is agitated for a short period of time, to render it substantially homogeneous throughout. The finished product is still an aqueous emulsion which is stable and in which the aqueous phase has dissolved therein the acetone-formaldehyde resin. The finished product is now coated on said paper by spreader rolls without foam building upon said rolls and to said coated paper may be applied the newsboard, for example, to provide a laminated structure of paper and newsboard with said finished product as the adhesive therebetween and having the improved characteristics before set forth. This laminated structure may be cut to provide improved bottle cap liners, for example.

The following are examples of some of the novel compositions of this invention, all parts being given by weight unless otherwise specified.

Example I 1000 parts of an aqueous emulsion of a vinyl resin was placed in a glass lined vessel. The vinyl resin was present in amount equal to 49% by weight of the emulsion and was solid copolymer of vinyl chloride and vinyl acetate ("Vinylite VYHH"). Then there was charged into said vessel, 625 parts of an aqueous solution of acetone-formaldehyde reaction product made according to Example A, and consisting of 125 parts of water and 500 parts of the acetone-formaldehyde reaction product with the viscosity of said solution at 25° C. being 2,300 centipoises, and hereinbefore identified as product 1A. After the addition of the acetone-formaldehyde solution the mixture was stirred for about 30 minutes whereby a substantially uniform and stable product hereinafter known as product I was obtained.

Example II 1000 parts of an aqueous emulsion of a vinyl resin was placed into a glass vessel. The vinyl resin was present in amount equal to 50% by weight of the emulsion and was solid polyvinyl chloride ("Vinylite QYHA"). Then there was charged into the vessel, 250 parts of an aqueous solution of acetone-formaldehyde reaction product made according to Example A, consisting essentially of 50 parts of water and 200 parts of acetone-formaldehyde reaction product, said solution having a viscosity at 25° C. of 7000 centipoises and hereinbefore identified as product 2A. The mix was rapidly stirred for about 20 minutes to provide a stable, homogeneous product hereinafter known as product II.

Example III 1000 parts of an aqueous emulsion of a vinyl resin was placed in a glass vessel. The vinyl resin was present in amount equal to 49% by weight of the emulsion and was solid polyvinyl acetate ("Vinylite AYAB"). Then there was added thereto 500 parts of an aqueous solution of acetone-formaldehyde reaction product made according to Example A and consisting essentially of 100 parts of water and 400 parts of acetone-formaldehyde reaction product, the viscosity of said solution at 25° C. being 3000 centipoises and hereinbefore identified as product 3A. The mix was stirred for 20 minutes to provide a stable homogeneous product hereinafter known as product III.

Examples IV–VI

Employing the same procedure, components and proportion of parts except that product A is substituted for products 1A–3A of Examples I–III respectively, products IV, V and VI were prepared.

While the novel combinations of this invention, examples of which are products I–VI and especially products I–III find application as adhesives for a variety of laminated structures, which, besides newsboard and paper which were given merely by way of example, may include cloth, wood, etc., they and especially products IV–VI may also be employed as coating media from which the water may be dissipated with or without heating. For example, they may be applied to a base and thereafter baked to drive off the water, or may be used as adhesives in the manufacture of wooden furniture, laminated wood, etc.

Example 1

Using a reverse roller type coater, one face of a 70 lb. kraft paper is one-side coated with products IV–VI respectively. The amount of such coating may vary and in general may be approximately 1 lb. of such coating per about 15 yards of the paper coated. Then the so coated paper is passed through an oven maintained at 300° F. whereby the water is driven off to provide a dry coated paper, with the coating having excellent adhesion.

Example 2

Product I, II or III is spread in a thin film on an 80 lb. kraft paper, by the use of a roller and smoothed with a Mayer bar and using about 1 lb. of such product for 10 square yards of paper. Then while still wet, newsboard is laid over said coated surface and the wet lamination is wound to form a roll. The roll is allowed to remain at room temperature for 48 hours after which time is may be unwound, and it will be found to be a strong lamination with the original coating material being in the substantially dry state. If desired, the exposed faces of either or both the newsboard or kraft paper may be subsequently coated with wax or other coating medium.

Since certain changes may be made in the above compositions of matter and different embodiments of the invention could be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which as a matter of language might be said to fall therebetween, and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

This application is a continuation-in-part of our copending application Serial No. 252,411, filed October 20, 1951, now abandoned.

Having thus described our invention, we claim:

1. A novel composition of matter comprising (a) an aqueous emulsion of a normally solid vinyl resin selected from the group consisting of polyvinyl acetate, polyvinyl chloride and copolymers of vinyl chloride and vinyl acetate and (b) resinous reaction product of acetone and formaldehyde produced under alkaline conditions, said resinous reaction product being water soluble and thermosetting, the ratio by weight of said vinyl resin to said resinous reaction product being 4 parts of said resinous reaction product to 1–16 parts of said vinyl resin, the viscosity of said resinous reaction product being such that an aqueous solution thereof measuring 4 parts by weight of said resinous reaction product to 1 part by weight of water is in the range of 600 to 10,000 centipoises at 25° C. said (b) being dissolved in the aqueous phase of (a).

2. A novel composition of matter defined in claim 1, but with the viscosity of such aqueous solution being in the range of 2,000 to 10,000 centipoises at 25° C.

3. A novel composition of matter comprising an aqueous emulsion of normally solid polyvinyl acetate and a resinous reaction product of acetone and formaldehyde produced under alkaline conditions and being water soluble and thermosetting, the ratio by weight of said polymer to said resinous reaction product being 4 parts of the latter to 1–16 parts of the former, the viscosity of said resinous reaction product being such that an aqueous solution thereof measuring 4 parts by weight of said resinous reaction product to 1 part by weight of water is in the range of 600 to 10,000 centipoises at 25° C. said resinous reaction product being dissolved in the aqueous phase of said emulsion.

4. A novel composition of matter defined in claim 3, but with the viscosity of such aqueous solution being in the range of 2,000 to 10,000 centipoises at 25° C.

5. A novel composition of matter comprising an aqueous emulsion of normally solid polyvinyl chloride and a resinous reaction product of acetone and formaldehyde produced under alkaline conditions and being water soluble and thermosetting, the ratio by weight of said polymer to said resinous reaction product being 4 parts of the latter to 1–16 of the former, the viscosity of said resinous reaction product being such that an aqueous solution thereof measuring 4 parts by weight of said resinous reaction product to 1 part by weight of water is in the range of 600 to 10,000 centipoises at 25° C. said resinous reaction product being dissolved in the aqueous phase of said emulsion.

6. A novel composition of matter defined in claim 5, but with the viscosity of such aqueous solution being in the range of 2,000 to 10,000 centipoises at 25° C.

7. A novel composition of matter comprising an aqueous emulsion of a normally solid copolymer of vinyl acetate and vinyl chloride and a resinous reaction product of acetone and formaldehyde produced under alkaline conditions and being water soluble and thermosetting, the ratio by weight of said resinous reaction product to said copolymer being 4 parts of the former to 1–16 parts of the latter, the visosity of said resinous reaction product being such that an aqueous solution thereof measuring 4 parts by weight of said resinous reaction product to 1 part by weight of water is in the range of 600 to 10,000 centipoises at 25° C. said resinous reaction product being dissolved in the aqueous phase of said emulsion.

8. A novel composition of matter defined in claim 7, but with the viscosity of such aqueous solution being in the range of 2,000 to 10,000 centipoises at 25° C.

References Cited in the file of this patent

UNITED STATES PATENTS

| | | |
|---|---|---|
| 1,514,508 | Ellis | Nov. 4, 1924 |
| 2,410,623 | Ballard et al. | Nov. 5, 1946 |